US009950272B2

(12) United States Patent
Lee et al.

(10) Patent No.: US 9,950,272 B2
(45) Date of Patent: Apr. 24, 2018

(54) LIQUID DISPENSING DEVICE

(75) Inventors: Byeong Kyeom Lee, Seoul (KR); Kwang Hyun Kim, Seoul (KR)

(73) Assignee: AMTPacific Co., Ltd., Seoul (KR)

( * ) Notice: Subject to any disclaimer, the term of this patent is extended or adjusted under 35 U.S.C. 154(b) by 579 days.

(21) Appl. No.: 14/387,251

(22) PCT Filed: Aug. 1, 2012

(86) PCT No.: PCT/KR2012/006138
§ 371 (c)(1),
(2), (4) Date: Dec. 15, 2014

(87) PCT Pub. No.: WO2013/141448
PCT Pub. Date: Sep. 26, 2013

(65) Prior Publication Data
US 2015/0122630 A1    May 7, 2015

(30) Foreign Application Priority Data

Mar. 23, 2012  (KR) .................. 10-2012-0030223

(51) Int. Cl.
    *B01D 3/00*    (2006.01)
    *B01D 3/14*    (2006.01)
(52) U.S. Cl.
    CPC ............. *B01D 3/008* (2013.01); *B01D 3/141* (2013.01)
(58) Field of Classification Search
    CPC .................. B01D 3/008; B01D 3/141
    See application file for complete search history.

(56) References Cited

U.S. PATENT DOCUMENTS

| 6,086,055 A * | 7/2000 | Armstrong ........... B01D 53/185 261/96 |
|---|---|---|
| 2003/0047438 A1 | 3/2003 | Tamura et al. |
| 2004/0026224 A1 | 2/2004 | Midori et al. |
| 2004/0182751 A1 | 9/2004 | Reyneke et al. |
| 2007/0043217 A1 | 2/2007 | Siegert et al. |
| 2008/0251127 A1 | 10/2008 | Zuber et al. |

FOREIGN PATENT DOCUMENTS

| CN | 1537026 | 10/2004 |
|---|---|---|
| DE | 69233121 | 4/2004 |
| DE | 10 2004 004530 | 8/2004 |
| DE | 2062628 | 5/2009 |
| EP | 0972551 | 1/2000 |
| JP | 09-075602 | 3/1997 |
| JP | 11-019401 | 1/1999 |
| JP | 3146422 | 3/2001 |
| JP | 2004-512924 | 4/2004 |
| JP | 2011-027296 | 2/2011 |
| KR | 10-0158453 | 12/1998 |
| WO | WO 99/56848 | 11/1999 |
| WO | WO 2013/141448 | 9/2013 |

OTHER PUBLICATIONS

International Search Report dated Feb. 26, 2013 From the Korean Intellectual Property Office Re. Application No. PCT/KR2012/006138 and Its Translation Into English.

* cited by examiner

Primary Examiner — Renee Robinson
Assistant Examiner — Derek Mueller

(57) ABSTRACT

The present invention relates to a liquid dispensing device which is placed inside a distillation column and can precisely control the supply ratio of a liquid to continuously supply the liquid. The liquid dispensing device is placed inside a distillation column, thereby reducing the total installation space.

11 Claims, 3 Drawing Sheets

LIQUID DISPENSING DEVICE

RELATED APPLICATIONS

This application is a National Phase of PCT Patent Application No. PCT/KR2012/006138 having International filing date of Aug. 1, 2012, which claims the benefit of priority of Korean Patent Application No. 10-2012-0030223 filed on Mar. 23, 2012. The contents of the above applications are all incorporated by reference as if fully set forth herein in their entirety.

TECHNICAL FIELD

The present invention relates to a liquid dispensing device, and in particular to a liquid dispensing device which is installed inside of a distillation column, thus continuously supplying liquid after the supply ratio of liquid is precisely adjusted.

BACKGROUND ART

A liquid dispensing device is generally installed at a washing tower, a absorption tower, etc. in the fields of oil refining, petro-chemistry and fine chemistry, which operates based on distillation, absorption and cooling principle so as to eliminate noxious gas or organic matter.

As a device used for distillation, absorption and cooling in industry fields, there is a column designed to separate a predetermined substance through air-liquid contacts. In order to save energy and investment cost, a divide wall column is generally used in recent years, which is configured to a structure constituted by combining two columns into one column. In this case, it needs to dispense, by using a pair of lower separation walls, the liquid present in the upper side into a predetermined ratio. At this moment, the liquid dispensing device adjusts a supply ratio of liquid.

At this moment, in order to adjust the above-mentioned supply ratio of liquid, there is provided a technology for arranging a liquid dispensing device outside of a distillation column.

When the liquid dispensing device is installed outside of the distillation device, a predetermined component interconnecting the distillation column and the liquid dispensing device is necessary. Also, a sizable space is necessary so as to install the liquid dispensing device.

DISCLOSURE OF INVENTION

Technical Problem

Accordingly, the present invention is made in an effort to improve the above-mentioned problems. It is an object of the present invention to provide a liquid dispensing device whose construction for dispensing liquid is disposed inside of the distillation thus makes it possible to save the whole installation space.

Solution to Problem

To achieve the above objects, there is provided a liquid dispensing device, comprising a housing disposed inside of a distillation column; lattice-shaped upper and lower grids which are disposed at the inner sides of top and bottom of the housing; a collector tray disposed at top of the inner side of the housing for thereby guiding the liquid inputted through the upper grid; a porous plate which is disposed at top of the collector tray and includes a plurality of through holes through which the guided liquid descends; a dispensing box which is disposed at a lower side of the porous plate and is configured to dispense the liquid which descends through the porous plate, through an outlet tube connected to both sides thereof to the outside of the housing; a liquid dispenser which is disposed at a lower side of the dispensing box and is configured to uniformly dispense and discharge the liquid dispensed by the dispensing box toward the lower side; a connection pipe connected to enable a fluid flow between the dispensing box and the liquid dispenser; an inlet pipe configured to enable a liquid input from the outside of the housing to the liquid dispenser; and a separation wall which is vertically disposed at a lower side of the housing for thereby bisecting the lower space of the housing into a first chamber and a second chamber.

The collector tray comprises a body plate; a plurality of risers which pass through the body plate for thereby enabling gas movement between the upper side and the lower side of the body plate; and a hat which is obliquely disposed on tops of the risers toward the porous plate for thereby preventing the liquid inputted through the upper grid from entering the risers.

Also, there is further provided a sump which has a ⊔-shaped cross section and is configured to interconnect the body plate and the porous plate.

The dispensing box comprises a box body which is formed in a rectangular parallelepiped shape and whose top is open; a first unit partition which is disposed inside of the box body and is configured to divide the inner side of the box body into a first unit chamber and a second unit chamber; and a second unit partition which is configured to interconnect the first unit partition and the inner wall of the box body for thereby forming a unit separation space.

The height of the first unit partition is lower than the height of the box body, and the height of the second unit partition is lower than the height of the first unit partition.

The first and second unit partitions are symmetrically disposed at both ends of the inner side of the box body.

The outlet tube is connected to discharge the liquid in the unit separation space to the outside, and the outlet tube is connected to the inlet tube in such a way to enable the discharged liquid to enter the liquid dispenser.

The liquid dispenser comprises a first unit dispensing unit which is formed in a hexahedron shape and whose top and bottom are open, and which is symmetrically disposed with respect to the first and second chambers; and a plurality of second unit dispensing units which are symmetrically disposed at both sides of the first unit dispensing unit and are connected to the first unit dispensing unit in such a way to enable the liquid to flow between the second unit dispensing units and the first unit dispensing unit.

The connection tube is configured to connect the first unit dispensing unit to the lower sides of the first and second unit chambers.

Advantageous Effects

The liquid dispensing device according to the present invention has advantageous effects in the way that the whole installation space may be saved because the construction for a liquid dispensing device configured to dispense liquid may be arranged inside of the distillation column.

BEST MODES FOR CARRYING OUT THE INVENTION

The preferred embodiments of the present invention will be described with reference to the accompanying drawings.

Figure 1:
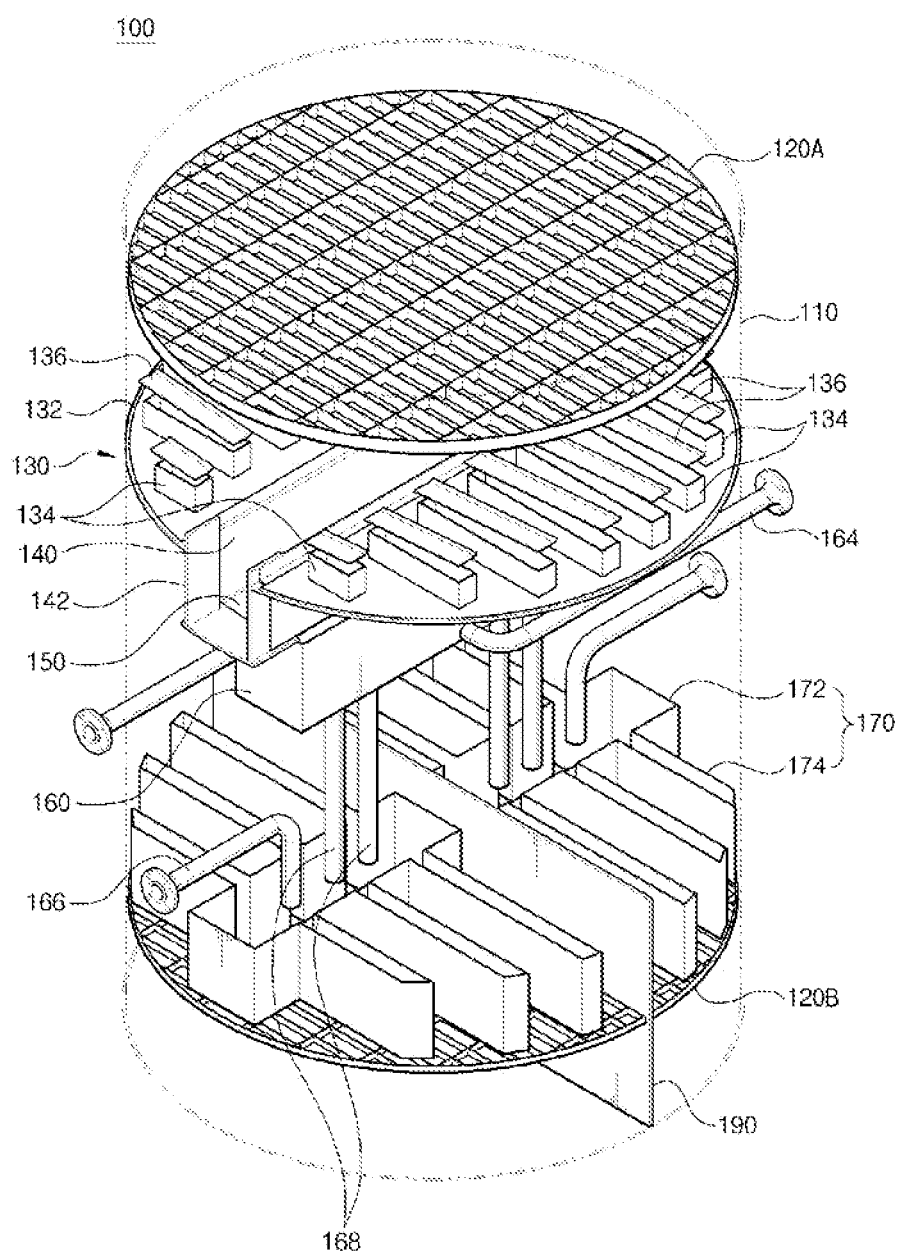
FIG. 1 is a perspective view illustrating a construction of a liquid dispensing device according to an exemplary embodiment of the present invention.

FIG. 1 is a perspective view illustrating a construction of a liquid dispensing device according to an exemplary embodiment of the present invention.

Referring to FIG. 1, the liquid dispensing device 100 according to an exemplary embodiment of the present invention comprises a housing 110, upper and lower grids 120a and 120b, a collector tray 130, a porous plate 150, a dispensing box 160, a liquid dispensing unit 170 and a separation wall 190.

The distillation column according to the present invention is a device configured to separate a predetermined substance through air-liquid contacts and is well known, so the detailed descriptions thereof will be omitted.

The housing 110 is disposed inside of the distillation column and is configured to isolate other components inside of the distillation column and the components which will be described later.

As illustrated in the drawings, the housing 110 is configured in a cylindrical shape; however it may be configured in a variety of shapes based on a user's demand.

The upper and lower grids 120a and 120b are arranged at top and bottom of the inner side of the housing 110.

The upper and lower grids 120a and 120b both are configured in the shapes of lattice. Here, the lattice shapes and arrangements of the upper and lower grids 120a and 120b may be practiced in many ways.

The upper and lower grids 120a and 120b are fixedly arranged at top and bottom of the inner side of the housing 110. It is preferred that the upper and lower grids 120a and 120b are configured to correspond to the shapes of the inner side of the housing 110.

A packing bed (not illustrated in the drawings) filled with a packing filler may be arranged at a predetermined height at top of the upper grid 120a and at bottom of the lower grid 120b.

Here, the upper grid 120a and the lower grid 120b are configured to fixedly support the packing beds which are arranged at top and bottom.

The collector tray 130 is arranged at a lower side of the upper grid 120a.

The collector tray 130 is a component provided for collecting liquid for the sake of liquid distribution in a way of side-draw.

Here, the collector tray 130 is configured in a predetermined shape corresponding to the shapes of the inner side of the housing 110. In the present exemplary embodiment of the present invention, since the housing 110 is cylindrical, it is preferred that the collector tray 130 is formed generally in a circular shape.

The collector tray 130 comprises a circular body plate 132 configured in a plate shape, a plurality of risers 134 arranged on the body plate 132, and a hat 136 which is spaced apart at a predetermined distance from tops of the risers 134.

The body plate 132 is configured in a circular shape at the center of which the porous plate 150 is disposed.

At either side of the porous plate 150, the risers 134 and the hats 136 are disposed in multiple numbers, respectively.

The risers 134 are formed in such a way to pass through the body plate 132 in order for gas to move. More specifically, the risers 134 are configured to allow air to smoothly move between the upper side and lower side of the body plate 132, thus balancing the pressure between the upper side and lower side of the body plate 132.

In the present exemplary embodiment of the present invention, the risers 134 are formed in rectangular shapes, but they may be formed in another shape such as a circular shape, a quadrangle shape, etc.

Since gas may move through the risers 134, when the liquid descends through the porous plate 150, the gas at bottom of the porous plate 150 ascends through the risers 134, so the pressure inside of the housing 110 may be uniformly adjusted.

Also, it is preferred that the risers 134 are formed at predetermined heights so as to prevent the liquid inputted from above from passing through.

The hats 136 are disposed at tops of the risers 134.

The hats 136 are configured to prevent the liquid inputted through the upper grid 120a from descending through the risers 134.

Here the hats 136 are obliquely arranged toward the porous plate 150, thus allowing the liquid inputted through the upper grid 120a to move toward the porous plate 150.

A sump 140 is arranged at the center of the collector tray 130.

The sump 140 has a U-shaped cross section which facilitates the liquid descending toward the collector tray 130 to gather. The sump 140 extends from one side of the collector tray 130 to the other end.

Here, at a connection portion between the body collector 132 and the sump 140, a shoulder with a predetermined height is formed, by means of which when the liquid inputted through the upper grid 120a gathers and becomes a predetermined amount, it can move over top of the shoulder. It is preferred that the height of the shoulder is lower than the heights of the hats 136. If the user does not want the provision of the shoulder, the shoulder may not be provided.

At either side of the sump 140, a reinforcing member 142 may be provided a connection with the porous plate.

At a lower side of the sump 140, the porous plate 150 is arranged.

Figure 2:
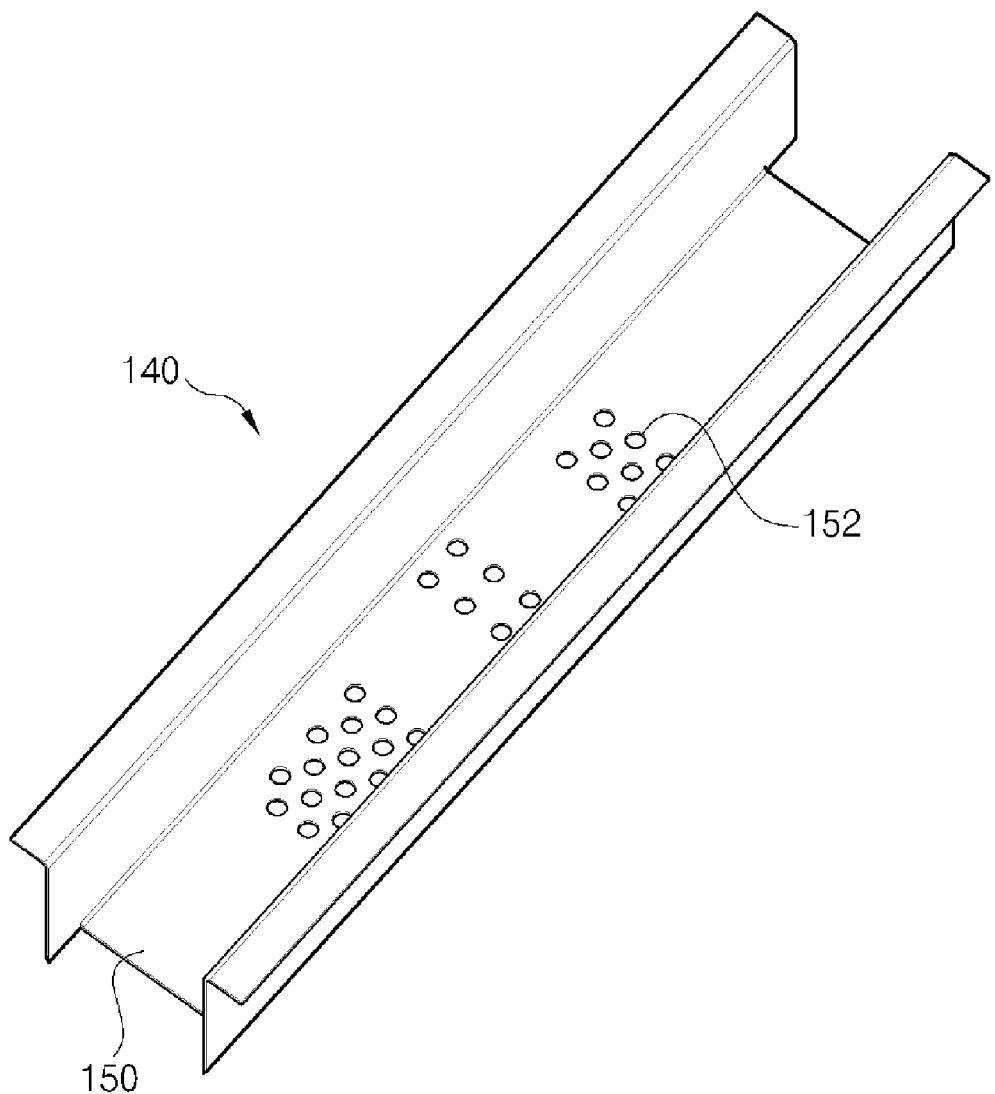
FIG. 2 is a perspective view illustrating a detailed construction of a porous plate illustrated in FIG. 1.

FIG. 2 is a perspective view illustrating a construction of the porous plate 150 of FIG. 1.

Referring to FIG. 2, the porous plate 150 serves to gather the liquid which is guided by means of the risers and the hats disposed at either side of the porous 150.

The porous plate 150 is formed in a rectangular shape and comprises a plurality of holes 152.

The sizes and arranged types of the holes 152 may be changed based on the necessity of the user (the dispensing ratio and flow rate of the liquid that the user wants to set).

Here, the porous plate 150 is disposed at a lower side of the sump 140, but the porous plate 150 may be directly installed at the body plate 132 without the sump 140.

The dispensing box 160 is installed at a lower side of the porous plate 150.

Figure 3:
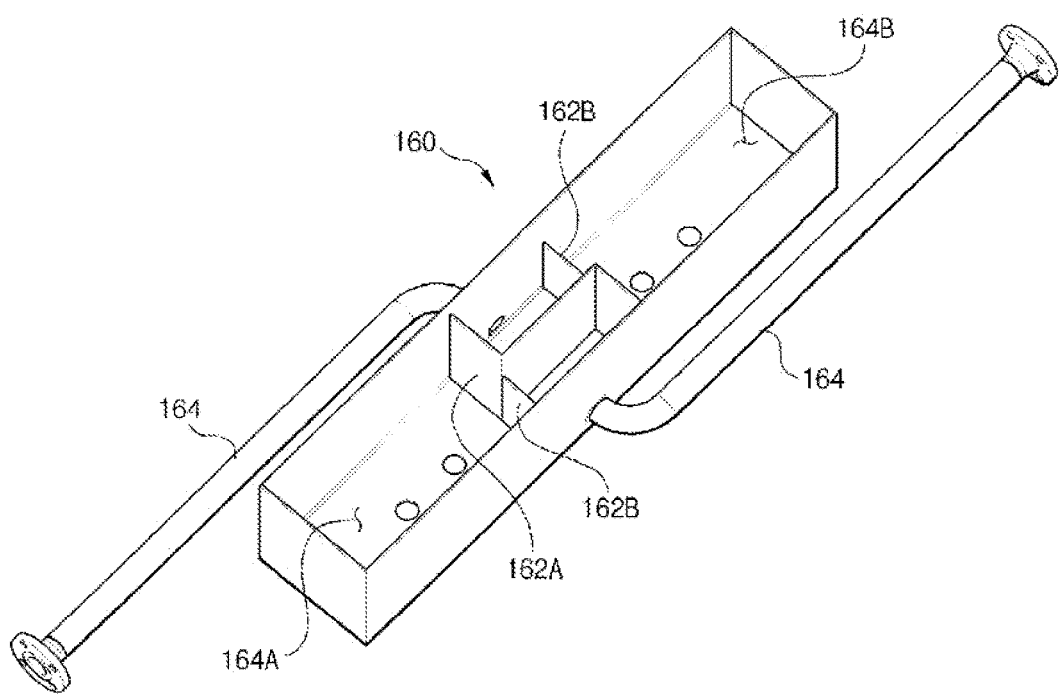
FIG. 3 is a perspective view illustrating a construction of a dispensing box illustrated in FIG. 1.

FIG. 3 is a perspective view illustrating a construction of the dispensing box 160 of FIG. 1.

Referring to FIG. 3, the dispensing box 160 is formed in a rectangular parallelepiped shape with a predetermined dimension, whose top is preferably open. The liquid supplied through the holes 152 may be inputted through the open portion of the top of the dispensing box 160. The dispensing box 160 may be sized based on the necessity of the user. It is preferred that it is sized to collect without any loss the liquid supplied through the holes 152 of the porous plate 150.

A plurality of unit partitions are disposed at the center of the inner side of the dispensing box 160.

In the present exemplary embodiment of the present invention, at the inner side of the dispensing box 160, the first and second unit partitions 162a and 162b with different heights and types are disposed.

Here, the first unit partition 162a is formed in a shape of " ⌐ ", whose both ends come into contact with both side walls of the inner side of the dispensing box 160. The interior of the dispensing box 160 may be divided into first and second unit chambers 164a and 164b by means of the first unit partition 162a. In the present exemplary embodiment of the present invention, it is preferred that the height of the first unit partition 162a is lower than the height of the dispensing box 160.

An end of the second unit partition 162b is connected to an outer side of the bent portion of the first unit partition 162a, and the other end comes into contact with the inner wall of the dispensing box 160. It is preferred that the height of the second unit partition 162b is lower than the height of the first unit partition 162a.

Here, the height of the second unit partition 162b may be higher than the height of the first unit partition 162a, if necessary.

The first and second unit partitions 162a and 162b may be arranged in a H-shape in the interior of the dispensing box 160.

According to the present exemplary embodiment of the present invention, the first and second unit partitions 162a and 162b are disposed in the above-described manner, but the number and types of the arrangements of such unit partitions may be changed based on the necessity of the user.

To either side of the dispensing box 160, an outlet tube 164 configured to discharge the dispensed liquid to the outside is connected. More specifically, the outlet tube 164 serves to enable the liquid in the space formed between the first unit partition 162a and the second unit partition 162b to move to the outside of the housing 110.

In a state that the first and second unit partitions 162a and 162b are arranged in the above manner, the liquid in the space between the first unit partition 162a and the second unit partition 162b among the liquid which has descended into the dispensing box 160 is discharged through the outlet tube 164 to the outside.

It is preferred that a predetermined value (not shown) is installed at the outlet tube 164 so as to intermittently control the discharge of the liquid. When the valve is closed, the liquid overflows through top of the first unit partition 162a toward both sides of the inner side of the dispensing box 160, namely, toward the first and second units chambers 164a and 164b.

The outlet tube 164 is connected to an inlet tube 166, so it is preferred that the liquid may be dispensed in the interior of the housing 110 without any loss of the discharged liquid.

To the both lower sides of the dispensing box 160, namely to the lower sides of the first and second unit chambers 164a and 164b, a connection tube 168 is connected so as to enable the liquid to move toward a liquid dispenser 170. In the present exemplary embodiment of the present invention, two connection tubes 168 are connected to an end of the dispensing box 160, respectively. The number of connections may be changed based on the necessity of the user.

The separation wall 190 divides the space of the inner lower side of the housing 110 into two parts. The separation wall 190 is formed in a plate shape with a predetermined size. It is preferred that the separation wall 190 is disposed on the central axis of the housing 110. Alternatively, the separation wall 190 may be eccentrically disposed.

The separation wall 190 may bisect the lower grid 120b.

The liquid dispenser 170 is disposed at a lower side of the dispensing box 160.

The liquid dispenser 170 is configured to uniformly dispense the liquid which is dispensed at a predetermined ratio in the dispensing box 160 to the packing bed of the lower side of the housing 110.

The liquid dispenser 170 is disposed in the spaces which are separated by the separation wall 190 vertically disposed at the center of the inner lower side of the housing 110.

The liquid dispenser 170 comprises a first unit dispensing unit 172 whose top and bottom are open and which is formed in a hexahedron shape with a predetermined width, length and height, and a plurality of second unit dispensing units 174 symmetrically disposed at either side of the first unit dispensing unit 172.

The first unit dispensing unit 172 is disposed in the spaces divided by the separation wall 190, respectively, in a direction perpendicular to the separation wall 190.

The second unit dispensing unit 174 is disposed at either side of the first unit dispensing unit 172. Here, the second unit dispensing unit 174 communicates with the first unit dispensing unit 172 in such a way that liquid can move between them. It is preferred that the second unit dispensing units 174 are disposed in a symmetrical shape.

It is preferred that the second unit dispensing unit 174 is disposed at a portion higher than the lower grid 120b.

The operations of the thusly constituted present invention will be described.

The liquid (circulating) discharged from the distillation column is inputted through the packing bed of the upper side and the upper grid 120a into the interior of the housing 110.

The inputted liquid spreads over the whole portions of the upper surface of the collector tray 130.

Thereafter, the liquid on the collector tray 130 descends through the holes 152 of the porous plate 150 into the dispensing box 160.

The liquid which has descended into the dispensing box 160 moves through the connection tube 168 from the first and second unit chambers 164a and 164b into the liquid dispenser 170.

Namely, the liquid which has descended into the dispensing box 160 is inputted trough the top of the second unit partition 162b into the space formed between the first unit partition 162a and the second unit partition 162b and is discharged through the outlet tube 164 to the outside. The discharge of the liquid may be intermittently controlled by adjusting the opening and closing of the valve installed at the outlet tube 164.

Meanwhile, the liquid which has been discharged through the outlet tube 164 to the outside may input through the inlet tube 166. The liquid inputted through the inlet tube 166 and the liquid inputted through the connection tube 168 gather on the first unit dispensing unit 172 and the second unit dispensing unit 174.

The liquid gathering on the first unit dispensing unit 172 and the second unit dispensing unit 174 descends through the lower grid 120b into the packing bed of the lower side.

The above-described exemplary embodiments of the present invention are provided for illustrative purposes and should understood in such a way that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A liquid dispensing device, comprising:
   a housing disposed inside of a distillation column;
   lattice-shaped upper and lower grids which are disposed at the inner sides of a top and a bottom of the housing;
   a collector tray disposed at the top of the inner side of the housing configured to guide a liquid inputted through the upper grid, thereby to collect the liquid;
   a porous plate which is disposed at top of the collector tray and includes a plurality of through holes through which the liquid descends during said guiding;
   a dispensing box which is disposed at a lower side of the porous plate and is configured to dispense the liquid which descends through the porous plate, through an outlet tube connected to both sides thereof to the outside of the housing;
   a liquid dispenser which is disposed at a lower side of the dispensing box and is configured to uniformly dispense and discharge the liquid dispensed by the dispensing box toward the bottom of the housing;
   a connection pipe, connected between the dispensing box and the liquid dispenser, to enable a fluid flow between the dispensing box and the liquid dispenser;
   an inlet pipe configured to enable a liquid input from the outside of the housing to the liquid dispenser; and
   a separation wall which is vertically disposed at the bottom of the housing for thereby bisecting the lower space of the housing into a first chamber and a second chamber.

2. The device of claim 1, wherein the collector tray comprises:
   a body plate;
   a plurality of risers which pass through the body plate, adapted to enable gas movement between the upper side and the lower side of the body plate; and
   a hat which is obliquely disposed on tops of the risers toward the porous plate, adapted to prevent the liquid inputted through the upper grid from entering the risers.

3. The device of claim 2, further comprising:
   a sump which has a ⊔-shaped cross section and is configured to interconnect the body plate and the porous plate.

4. The device of claim 1, wherein the dispensing box comprises:
   a box body which is formed in a rectangular parallelepiped shape and whose top is open;
   a first unit partition which is disposed inside of the box body and is configured to divide the inner side of the box body into a first unit chamber and a second unit chamber; and
   a second unit partition which is configured to interconnect the first unit partition and the inner wall of the box body for thereby forming a unit separation space.

5. The device of claim 4, wherein the height of the first unit partition is lower than the height of the box body, and the height of the second unit partition is lower than the height of the first unit partition.

6. The device of claim 5, wherein the first and second unit partitions are symmetrically disposed at both ends of the inner side of the box body.

7. The device of claim 4, wherein the outlet tube is connected to discharge the liquid in the unit separation space to the outside.

8. The device of claim 7, wherein the outlet tube is connected to the inlet tube in such a way to enable the discharged liquid to enter the liquid dispenser.

9. The device of claim 1, wherein the liquid dispenser comprises:
   a first unit dispensing unit which is formed in a hexahedron shape and whose top and bottom are open, and which is symmetrically disposed with respect to the first and second chambers; and
   a plurality of second unit dispensing units which are symmetrically disposed at both sides of the first unit dispensing unit and are connected to the first unit dispensing unit in such a way to enable the liquid to flow between the second unit dispensing units and the first unit dispensing unit.

10. The device of claim 4, wherein the connection tube is configured to connect the first unit dispensing unit to the lower sides of the first and second unit chambers.

11. The device of claim 9, wherein the connection tube is configured to connect the first unit dispensing unit to the lower sides of the first and second unit chambers.

* * * * *